United States Patent [19]

Bouche et al.

[11] 4,086,197

[45] Apr. 25, 1978

[54] HARDENERS FOR EPOXY RESINS

[75] Inventors: Claude Bouche; Francois Lenclud, both of Mazingarbe, France

[73] Assignee: Societe Chimique des Charbonnages, Paris, France

[21] Appl. No.: 697,751

[22] Filed: Jun. 21, 1976

[30] Foreign Application Priority Data

Jun. 20, 1975 France .................................. 75 19387

[51] Int. Cl.$^2$ .............................................. C08L 91/00
[52] U.S. Cl. ........................... 260/18 PN; 260/18 EP; 260/29.2 EP; 260/33.4 EP; 260/37 EP; 260/404.5
[58] Field of Search .... 260/18 PN, 18 EP, 404.5 PA, 260/29.2 EP, 33.4 EP

[56] References Cited

U.S. PATENT DOCUMENTS

| | | | |
|---|---|---|---|
| 2,976,179 | 3/1961 | Westlund, Jr. et al. | 260/404.5 PA |
| 3,134,759 | 5/1964 | Kirkpatrick et al. | 260/404.5 PA |
| 3,166,548 | 1/1965 | Kirkpatrick et al. | 260/404.5 PA |
| 3,169,980 | 2/1965 | Benoit, Jr. | 260/404.5 PA |
| 3,231,528 | 1/1966 | McWhorter et al. | 260/404.5 PA |
| 3,462,284 | 8/1969 | Vertnik | 260/404.5 PA |
| 3,622,604 | 11/1973 | Drawert et al. | 260/404.5 PA |
| 3,776,865 | 12/1973 | Glaser et al. | 260/404.5 PA |

*Primary Examiner*—Eugene C. Rzucidlo

[57] ABSTRACT

The invention relates to polyamino-amide hardeners for epoxy resins, the hardeners being the product resulting from the limination of at least one mole of water per acid equivalent from a mixture of:

90 to 60 parts of at least one unsaturated monomeric fatty acid having at least 12 carbon atoms, 10 to 40 parts of an acid having a molecular weight less than 200

20 to 80 parts of a polyalkylene-polyamine, and 80 to 20 parts of isophorone diamine, the relative proportions of all the acid products with respect to all the amine products being from 1 to 2 gramme equivalents of acid function per gramme molecule of amine.

The invention also relates to a method of hardening epoxy resins using the above hardeners.

14 Claims, No Drawings

HARDENERS FOR EPOXY RESINS

The present invention relates to new polyamino-amide hardeners for epoxy resins, having low viscosity and which are particularly suitable for the preparation of surface coatings without a solvent and the hardening of epoxy resins in an aqueous emulsion.

It is well known that it is possible to initiate the hardening of epoxy resins by using polyalkylene-polyamines as hardeners. These products have the drawback of being toxic and of emitting unpleasant vapours. It is known to transform them into compounds which are easier to handle, by reacting them with polymeric fatty acids. The polyamino-amides thus obtained in turn have the drawback of being very viscous and are consequently unsuitable for the formulations of surface coatings without a solvent.

However, from the double point of view of hygiene (pollution) and safety, the use of solvents, which are for the most part inflammable, in the compositions of surface coatings, should be avoided.

In the compositions of epoxy resins for surface coatings, it is known to replace the solvents by water, by thus preparing emulsions or dispersions of the resins and/or hardeners in an aqueous phase and even actual solutions of certain hardeners in water. For example, polyamines and polyalkylene-polyamines are generally very soluble in water, but when placed in contact with an aqueous emulsion of epoxy resin, they have the drawback of coagulating said emulsion. On the contrary, polyamino-amides obtained by the reaction of polyalkylene-polyamines and fatty acids do not have this drawback. On the other hand, they have the advantage of hardening epoxy resins and their aqueous emulsions at ambient temperature.

However, the compositions proposed hitherto have several defects: the high viscosity of the hardeners used has the result that the preparation of surface coatings without a solvent is difficult and that the coatings obtained do not have a good surface condition. Due to their high viscosity and the low volatility of water, the use of these same hardeners for hardening emulsions of epoxy resin leads to coatings which dry badly or may be applied solely to porous supports which, owing to their nature, absorb part of the water contained in the composition. In addition, known hardeners produce coatings which yellow when exposed to light.

By hardening epoxy resins or aqueous emulsions of said resins, the applicant has found that it was possible to obtain coatings which dry easily, adhere well even to non-porous supports (metal) and do not yellow under the influence of light, by hardening said resins or their aqueous emulsions by means of hardeners which are the subject of the present invention.

These new hardeners for epoxy resins are characterised in that they result from the elimination of at least one gram molecule of water per equivalent of acid of a mixture of:

90 to 60 parts of at least one unsaturated monomeric fatty acid having at least 12 carbon atoms 10 to 40 parts of a mono or polyacid having a molecular weight less than 200 and of 20 to 80 parts of polyalkylene-polyamine 80 to 20 parts of (3,5,5-trimethyl-3-amino-methyl cyclohexyl amine) isophorone diamine.

The relative proportions of all the acid products with respect to all the amine products being from 1 to 2 gram equivalents of acid function per gram molecule of amine.

Natural or synthetic unsaturated monomeric fatty (= aliphatic) acids (one or more double bonds), either pure or in a mixture, having a carbon chain greater than or equal to $C_{12}$ are suitable for carrying out the invention. The following acids may be used, for example, lauroleic, myristoleic, palmitoleic, elaidic, cetoleic, linoleic, linolenic, arachidonic, ricinoleic acids, unsaturated acids coming from tall oil, soya bean oil, sunflower oil, linseed oil, etc., and preferably oleic acid.

Amongst the mono or polyacids of molecular weight less than 200 suitable for carrying out the invention are saturated aliphatic or araliphatic monoacids, or mono ethylenic unsaturated monoacids, aromatic monoacids, aliphatic diacids.

It is thus possible to use acetic acid, propionic acid, butyric acid, phenylacetic acid, acrylic acid, methacrylic acid, cinnamic acid, benzoic acid, toluic acid, glutaric acid, adipic acid, succinic acid, etc.

The applicant has in fact found and this is surprising, that by adding an acid of molecular weight less than 200 to the unsaturated monomeric fatty acid in the preparation of hardeners according to the invention, one obtained hardeners which hardened epoxy resins better and quicker than if they were prepared solely from the unsaturated monomeric fatty acid. In addition, the use of an acid having a molecular weight less than 200 increases the solubility in water of the hardener obtained.

Polyalkylene-polyamines which may be used according to the invention will be more particularly polyethylene polyamines and preferably tetraethylene-pentamine (TEPA).

Jointly, isophorone diamine (IPD) is used as the other compound.

In fact, the applicant has found that the use of IPD gives the hardeners obtained better resistance to light. On the other hand, it is not possible to use IPD alone, the hardeners obtained in this way not having sufficient aminated hydrogens and being too viscous (pasty). The polyalkylene-polyamine and in particular TEPA gives the hardeners obtained certain solubility in water, surface-active properties and low viscosity.

The present invention also relates to hardeners obtained by replacing the monomeric unsaturated fatty acid up to an amount of 70% by weight, by at least one polymeric fatty acid.

Polymeric linoleic acid in its different qualities, whether purified or unpurified, may be used as the polymeric fatty acid. An acid containing essentially dimeric linoleic acid will preferably be used.

The hardeners according to the invention will be prepared by heating the chosen and calculated quantities of the initial products, with stirring, in order to raise the temperature of the reaction medium up to at least 160° C. The water produced by the reaction is removed, by distillation, from the reaction medium as it forms.

The maximum temperature and reaction time will be chosen in order to eliminate the quantity of water initially provided. This quantity may vary between 1 and 2 moles of water per gram equivalent of acid function present initially.

Preferably, when it is desired to eliminate only one mole of water, the temperature is kept at approximately 180° and the reaction is stopped when this mole of water has been liberated. If it is desired to eliminate more than one mole of water, heating is continued to a temperature higher than 180° C.

Any epoxy resin may be hardened by the hardeners prepared according to the invention. These epoxy resins containing on average more than one epoxy cycle (oxiran) per molecule, could be used as such or mixed with a mono or polyepoxy reactive diluent.

These epoxy resins could be products obtained by the reaction of an epihalohydrin with a compound comprising more than one active hydrogen atom per molecule. These will be polyglycidylether of polyphenols or polyols, polyglycidylesters of polyacids, polyglycidylamines etc. in particular.

The preferred polyglycidylethers will be those coming from the reaction of an epihalohydrin, in particular epichlorohydrin, with polyphenols such as Bis-phenol A, Bis-phenol F, resorcinol, novolac resins prepared by the reaction of formaldehyde with phenol, etc.

Phenylglycidylether, cresylglycidylethers, butylglycidylether, glycidylic ethers of monoalcohols at C8, C9, C10, etc., may be used as the reactive diluents for these epoxy resins.

Prior to hardening, diluted or undiluted epoxy resins may be dispersed in water to obtain aqueous emulsions.

If desired, the hardeners according to the invention may also be made into a solution or aqueous dispersion.

The aqueous solutions or dispersions of the hardeners will be prepared by mixing the chosen hardener and water such that 5 to 35 parts water are used for 100 parts hardener.

If it is desired to prepare a more dilute hardener system, there is also preferably used a small quantity of alcohol intended to facilitate the formation of a solution or dispersion and in the case of dispersions, to prevent the coagulation of hardener micelles. Thus, the mixtures obtained will be between the following compositions Hardener/water/alcohol: 30/50/20 to 70/25/5 for example (the values given are parts by weight). The quantity of alcohol used is greater the more water contained in the mixture.

Monoalkyl ethers of ethylene or glycol propylene or isopropyl alcohol may be used as the alcohols.

The respective quantities of the resin part and hardener part will be such that one reacts approximately one epoxy cycle of the resin part per aminated hydrogen of the hardener part.

The preferred application of the epoxy resin compositions whether or not diluted with the above compounds, whether or not in an aqueous emulsion, whether or not containing mineral fillers and/or pigments and hardeners according to the invention, relates to the field of surface coatings. One could thus obtain varnishes, coatings or paints, which may be applied to any supports, are resistant to chemical products and to light and have good mechanical properties.

In particular, the compositions according to the invention make it possible to prepare emulsion paints able to be used as floor coverings or anti-corrosion paints. These paints have the particular feature, which is very advantageous for the user, of being able to clean the application means with water, without any use of organic solvents. The paint films obtained after hardening are themselves insensitive to water.

The following examples are given as an illustration of the invention.

EXAMPLE 1

Preparation of Hardeners

The hardeners suitable for hardening epoxy resins, whether or not in an emulsion in water and suitable for resin compositions serving as a base for coatings or paints according to the invention, will be prepared for example from the following raw materials (Table I).

TABLE I

| Raw Materials | No. of hardener | | | | |
| --- | --- | --- | --- | --- | --- |
|  | I | II | III | IV | VI |
| Oleic acid | 42.6 | 32.8 | 40 | 17 | 37.1 |
| Dimeric fatty acid (EMPOL (R) 1024)* | — | — | — | 29.7 | — |
| Benzoic acid | 10.7 | — | — | 9.5 | — |
| Acrylic acid | — | 12.4 | — | — | — |
| Adipic acid | — | — | 10 | — | — |
| Propionic acid | — | — | — | — | 11.3 |
| Tetraethylene pentamine | 21.5 | 29.8 | 30 | 19.1 | 30.9 |
| Isophorone diamine | 25 | 24.8 | 20 | 24.4 | 20.6 |

*Product of the firm UNILEVER EMERY. The values given are parts by weight.

The ratio $\frac{\text{gramme equivalent of COOH function}}{\text{gramme molecule of amine}}$ common to all these hardeners is equal to 1.

These hardeners, as well as those described hereafter by way of comparison, are all prepared in the following manner:

One places in a reactor, which may be agitated, heated and cooled (possibly provided with a temperature control device) and provided with a condenser, all the amines, which are heated to 80° C. The mixture of acids are then added progressively, whilst making sure that during this addition, the temperature of the reaction medium does not exceed 120° C. Then, this temperature is progressively increased up to a maximum of 180° C. There occurs a liberation of water, which is separated. When one gram molecule of water per gram equivalent of acid function present at the beginning has formed, the heating is stopped, the mixture is cooled and the reactor emptied.

The products obtained have the following characteristics: (Table II).

TABLE II

| No. of hardener | I | II | III | IV | V |
| --- | --- | --- | --- | --- | --- |
| Viscosity in poises at 25° C | 31 | 295 | 75 | 300 | 35 |
| Amine Index (1) | 370 | 355 | 340 | 285 | 360 |
| Proportion used for 100 g liquid epoxy resin (2) in g. | 50 | 42 | 45 | 50 | 42 |
| Pot-life (3) at 20° C in mins. | 60 | 110 | 100 | 90 | 120 |
| Solubility in water at 20° C | Dispersible | Soluble | Soluble | Dispersible | Dispersible |
| Solubility in an 8/3 mixture of water/isopropanol at 20° C | thick gel | very fluid gel | very fluid gel | fluid | fluid gel |

(1) Equivalent basicity expressed in mg of KOH per g. of hardener.
(2) Epoxy resin having an epoxy equivalent (quantity of resin in grammes containing a gram equivalent of epoxide oxygen) of an average of 190 and derived from Bis-phenol A and epichlorohydrin of the LOPOX (R) 200 type produced by CDF CHIMIE
(3) Pot life measured with 50g resin + hardener mixture, in the proportions shown.

EXAMPLE 2

Hardeners Prepared by Way of Comparison

TABLE III

| Raw Materials in parts by weight | No. of hardener | | | |
|---|---|---|---|---|
| | V | VII | VIII | IX |
| Oleic Acid | 38.6 | — | — | 46.5 |
| Dimeric fatty acid (EMPOL (R) 1024) | — | 39.2 | 47 | — |
| Adipic Acid | 10 | 9.8 | 11.7 | 11.6 |
| Tetraethylene pentamine | 51.4 | 50.9 | 41.1 | 41.8 |
| Ratio $\frac{\text{gramme equivalent of COOH}}{\text{gramme molecule of amine}}$ | 1 | 1 | 1.5 | 1.5 |
| Characteristics | | | | |
| Viscosity in poises at 25° C | 50 | 1332 | 8164 | 115 |
| Amine index | 470 | 450 | 325 | 350 |
| Proportion used in g for 100 g LOPOX (R) 200 resin | 33 | 34 | 45 | 42 |
| Pot life of 50g mixture of 20° in mins. | 50 | 65 | too viscous | 150 |
| Solubility in water at 20° C | Cloudy Solution | Cloudy gel | too viscous and cloudy gel | Cloudy gel |
| Solubility in an 8/3 mixture of water/isopropanol at 20° C | flid gel | Clear Solution | Clear Solution | fluid gel |

It will be noted that these four hardeners are prepared without using isophorone diamine. On the other hand, VII and VIII are prepared without oleic acid. These two latter hardeners are extremely viscous and produce coatings which do not dry easily. These four hardeners produce coatings having a considerable tendency to yellow.

EXAMPLE 3

Preparation of Aqueous Solutions or Dispersions of Hardeners

The hardeners according to the invention may be used as such. But if desired, prior to the hardening reaction, it is possible to prepare aqueous solutions or dispersions of these hardeners for example, by mixing the following products: (The quantities are parts by weight).

TABLE IV

| Products used | No. of the aqueous formulation of hardener | | |
|---|---|---|---|
| | S I | S IIIa | S IIIb |
| Hardener No. I | 90 | — | — |
| Hardener No. III | — | 90 | 90 |
| Water | 85 | 85 | 80 |
| Monomethyl ether of ethylene glycol | 25 | 25 | — |
| Isopropyl alcohol | — | — | 30 |

These solutions or dispersions may be used, according to the invention, for hardening epoxy resins whether or not in the form of an aqueous emulsion. Taking into account the amine indices of the hardeners used, it is easy to calculate the amine indices after dilution and consequently the quantities to be used for hardening a given quantity of epoxy resin.

EXAMPLE 4

Obtaining Epoxide Paints in an Aqueous Emulsion

The formulations given hereafter in no way limit the range of application of the hardeners according to the invention. The purpose of the latter is to give details of a preferred use.

4a. Example of floor paint which may be applied by a brush or spray gun, even to wet concrete, which will harden when cold (6 to 8 hours at 20°).

An emulsion of epoxy resin with filler is firstly produced by mixing the following products:

| | |
|---|---|
| Epoxy resin of the LOPOX (R) 200 type | 500 (parts by weight) |
| Polyoxyethylene Octylphenol | 25 |
| Polyoxyethylene Lauric alcohol | 13 |
| Water | 250 |
| Silica No. 100 | 400 |
| Titanium Oxide | 150 |
| Anti-foaming agent | 1 |

This emulsion will be called "Base A" in the following examples.

Just before application of the paint, the following mixture is produced:

| | |
|---|---|
| Base A | 100 (parts by weight) |
| Water | 45 |
| Solution of hardener SIIIa | 43 |
| Anti-foaming agent | 1 |

4b. Example of paint for a concrete floor, able to be applied by a paint roller without producing any surface defects nor bubbles It is obtained by mixing before application:

| | |
|---|---|
| Base A | 100 (Parts by weight) |
| Water | 45 |
| Solution of hardener S IIIb | 43 |
| Anti-foaming agent | 1 |
| Black pigment | 1 |

4c. Example of anti-corrosion paint

The epoxy resin emulsion given below is firstly prepared by mixing:

| | |
|---|---|
| Epoxy resin of the LOPOX (R) 200 type | 500 (parts by weight) |
| Polyoxyethylene Octylphenol | 25 |
| Polyoxyethylene Lauric alcohol | 13 |
| Water | 250 |
| Barium sulphate | 400 |
| Titanium Oxide | 150 |
| Anti-foaming agent | 1 |

This emulsion will be called "Base B."

Before application, the preparation of the paint will take place by mixing:

| | |
|---|---|
| Base B | 100 (Parts by weight) |
| Water | 45 |
| Solution of hardener S IIIa | 43 |

4d. Other examples of anti-corrosion paints

These formulations are given in the following Table V. The epoxy resin emulsion is firstly prepared, then the hardener part. Before application, the mixture of emulsion + hardener part is produced.

The application is carried out by a spray gun in two layers (approximately 140g/m² on sanded and dried steel sheets.

TABLE V

| Formulation No. Components | F1 | F2 | F3 | F4 |
|---|---|---|---|---|
| Liquid epoxy resin of LOPOX (R) 200 type | 1500 | 1500 | 1500 | 1500 |
| Polyoxyethylene octylphenol | 75 | 75 | 75 | 75 |
| Polyoxyethylene lauric alcohol | 37.5 | 37.5 | 37.5 | 37.5 |
| Water | 750 | 750 | 750 | 750 |
| Titanium oxide | 1125 | 1125 | 1500 | 1125 |
| Barium sulphate | 262.5 | 1762 | — | 262.5 |
| Hardener No. I (Example 3) | 890 | 890 | 890 | — |
| Solution of Hardener S IIIb | — | — | — | 1500 |
| Anti-foaming agent | — | — | — | 37.5 |

After hardening, the threshold characteristics of the paint obtained are very similar:

| | |
|---|---|
| Cross ruling adhesion | Good |
| Scratch test | Very good (7 to 9 kg) |
| Washing with water | Very good (no loss of gloss after 15,000 washes) |
| Resistance to ultra-violet | Good, after 1000 hours xenotest. |

| | |
|---|---|
| Chemical resistance : Water (even boiling) 10% NaCl Vegetable Oil Fuel 10% NaOH Alcohol : mechanically resistant but yellows. | Good (no corrosion after six months contact at 20° C.) |

By way of comparison, the applicant tested a formulation which contained no isophorone diamine in the composition of the hardener: the coatings obtained showed rust spots during drying and yellowed when exposed to ultra-violet rays.

What is claimed is:

1. A hardener for an epoxy resin, comprising the product resulting from the elimination of at least one mole of water per acid equivalent from a mixture of:
   - 90 to 60 parts of at least one unsaturated monomeric fatty acid having at least 12 carbon atoms,
   - 10 to 40 parts of an acid having a molecular weight less than 200
   - 20 to 80 parts of a tetraethylene pentamine, and
   - 80 to 20 parts of isophorone diamine, the relative proportions of all the acid products with respect to all the amine products being from 1 to 2 gram equivalents of acid function per gram molecule of amine.

2. A hardener according to claim 1 wherein the unsaturated monomeric fatty acid is oleic acid.

3. A hardener according to claim 1 wherein the acid having a molecular weight less than 200 is acrylic acid, propionic acid, benzoic acid or adipic acid.

4. A hardener according to claim 1 wherein the unsaturated monomeric fatty acid is replaced up to 70% by weight by at least one polymeric fatty acid.

5. A hardener according to claim 4 wherein the polymeric fatty acid is dimeric linoleic acid.

6. An aqueous emulsion of a hardener according to claim 1 comprising 30 to 95% hardener and preferably a solvent for said hardener of alcohol type.

7. An aqueous solution of a hardener according to claim 1 comprising 30 to 95% hardener and preferably an alcohol.

8. Method of preparing a hardener for epoxy resin according to claim 1 comprising heating the mixture of acids and amines, with stirring, to a temperature of at least 160° C, and removing the water, formed by reaction, from the reaction medium.

9. Method according to claim 8, wherein the temperature is preferably 160° to 180° C and the reaction is continued until a gram molecule of water is eliminated per gram equivalent of acid function present at the beginning.

10. Method of hardening an epoxy resin comprising reacting a quantity of a hardener according to claim 1 containing a gram equivalent of aminated hydrogen with a quantity of epoxy resin containing approximately 1 gram equivalent of epoxide oxygen.

11. Method according to claim 10 wherein the hardener is used in the form of aqueous emulsions or solutions.

12. Method of use according to claim 10 wherein the epoxy resin is previously made into an emulsion in water.

13. Method according to claim 12 wherein the epoxy resin emulsion contains at least one filler, pigment and/or modifying agent.

14. Coatings obtained by hardening epoxy resins according to the process of claim 10.

* * * * *